K. SCHAEFER.
PROCESS OF PRODUCING HYDROGEN.
APPLICATION FILED JULY 14, 1914.
1,144,730.
Patented June 29, 1915.
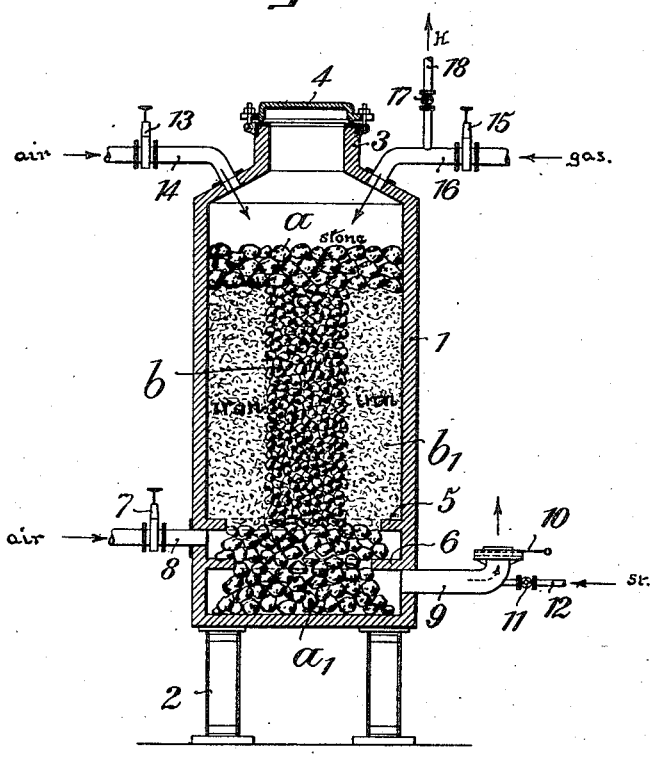
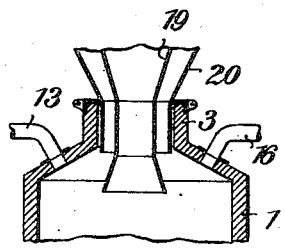
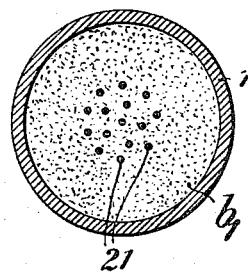
Witness:
Charles A. Mathé
Inventor:
Karl Schaefer
by John Lotka
Attorney

UNITED STATES PATENT OFFICE.

KARL SCHAEFER, OF CHARLOTTENBURG, GERMANY, ASSIGNOR TO BERLIN-ANHALTISCHE MASCHINENBAU-AKTIEN-GESELLSCHAFT, OF BERLIN, GERMANY, A CORPORATION OF GERMANY.

PROCESS OF PRODUCING HYDROGEN.

1,144,730.     Specification of Letters Patent.     Patented June 29, 1915.

Application filed July 14, 1914. Serial No. 851,015.

*To all whom it may concern:*

Be it known that I, KARL SCHAEFER, a citizen of the Empire of Germany, and a resident of Charlottenburg, Germany, have invented certain new and useful Improvements in the Process of Producing Hydrogen, of which the following is a specification.

My invention relates to improvements in the process of producing hydrogen, and more particularly in the process in which a reducing gas and steam are alternately passed through a mass of heated iron inclosed within upright retorts.

In the process of producing hydrogen within chambers which are filled with a mass of iron it is difficult to cause a uniform flow through the whole charge of the reducing gases used for heating the charge and the steam used for reducing the same. In the inner parts of the mass of iron the parts of the iron charge are in thorough contact and entangled with each other, while at the smooth side walls of the chamber free passages are formed, so that the gases flowing along the smooth side walls find almost no resistance and a stronger current of the gases is produced along the side walls than within the mass of iron. The non-uniform flow of the gases is objectionable in the process, because a part of the reaction gases flows through the chamber without being utilized and the steam passes through the chamber without being sufficiently decomposed by the iron. In both steps of the process an excessive amount of gas and steam is necessary. The vehement reaction which takes place near the side walls of the chamber is liable to cause superheating of the charge, and the central core of the charge is utilized in part only, and after some time it forms an entirely dead mass. Besides the side walls of the reaction chamber are subject to heavy wear, because they are subject not only to the increased effect of the heating gases but also to the corroding effect of the large mass of hot reducing gases.

The object of the improvements is to provide a method in which the heating of the mass of iron and the production of hydrogen are improved.

With this object in view my invention consists in charging the central part of the chamber with pieces of iron which are larger than those located near the walls of the chamber. By charging the parts of the chamber with iron pieces of the proper sizes I am enabled to provide perfectly uniform passages for the gases throughout the chamber, and I am even enabled to so distribute the masses of iron, that the flow of the gases through the central part of the chamber is stronger than near the walls, whereby the injurious effect of the gases on the side walls is safely avoided.

An example of an apparatus suitable for carrying out this invention is shown in the accompanying drawings, in which—

Figure 1 is a vertical section of the apparatus filled and ready for operation; Fig. 2 is a detail vertical section of the upper part of the apparatus with means for filling it in the manner shown in Fig. 1; and Fig. 3 is a horizontal section showing a slightly different filling.

The apparatus shown comprises a chamber or shell 1 supported on posts 2 and provided with a filling neck 3 normally closed by a cover 4. Two annular ribs 5 and 6 respectively form a lower compartment at the bottom of the shell 1; between these two ribs a pipe 8, provided with a shut-off valve 7, is connected with said lower compartment to supply a secondary blast of air thereto, while below the rib 6 the said compartment is connected with an outlet pipe 9, controlled by a valve 10, for the escape of the hot combustion products. Steam may be admitted to said lower compartment at proper times, through a pipe 12, provided with a shut-off valve 11. Air under pressure may be admitted to the other (upper) end of the shell 1 through a pipe 14, provided with a controlling valve 13. This end of the shell is also provided with another pipe 16, adapted to serve for the admission of reducing gas, when the valve 15 is open, or for the escape of hydrogen gas through a branch pipe 18, when the valve 17 is open.

In carrying out the invention the chamber 1 may be filled with iron pieces $b$, $b_1$ of different sizes by means of charging means constructed in the form of a funnel 19, 20 having two concentric discharges the central discharge being provided for the pieces of iron $b$ of larger size and the outer one which surrounds the central one in the form of a concentric jacket being provided for the smaller pieces of iron $b_1$. The charge may also be subdivided in columns composed of iron pieces of different sizes by composing the columns of solid or tubular iron rods 21 which are placed in the form of lattice-work, and which provide a frame work for a loose mass of iron which may be charged either by hand or by mechanical means. Preferably the said iron rods are so thin that they are gradually oxidized in the course of the process, so that they break when emptying the chamber and do not hinder the discharging of the mass of iron from the chamber.

I have found that in practice when supplying heating gas and air to the charge and a part of the charge is once excessively heated, irregularities are caused in the process which start from this part and are gradually transmitted to the surrounding parts, because the resistance offered by the charge to the flow of the gases is irregular. The non-uniform flow of the gases causes vehement reactions and superheating of the mass, whereby the mass is impaired. Similar irregularities are thereafter observed when the reducing gas and the steam are thereafter passed through the charge. It will readily be understood, that thereby the consumption in reducing gas is increased and that ordinarily the output in hydrogen is reduced. To avoid this objection I prefer to provide between the gas and air inlet end of the chamber (that is to say, the upper end in Fig. 1) and the charge of iron a layer $a$ of good heat storing bodies.

In some cases it is necessary to superheat the steam. In order to distribute the superheated steam uniformly through the whole mass, I prefer to provide a layer of refractory stones $a_1$ in advance of the reaction chamber proper, and to burn within the said stones the gases coming from the reaction chamber during the reducing period by supplying thereto through the pipe 8 air for supporting combustion. The heat which is thus produced is taken up by the stones $a_1$ and is transmitted to the steam which is subsequently caused to pass through such stones. The said stones should be located immediately at the part of the chamber where the reducing gases coming from the charge of iron are discharged, because the poor gas which comes from the charge of iron would not be ignited, if even a small part of the heat were lost, as would be the case if the stones were located at a distance from the discharge of the gases.

As appears from the above, my improved process is particularly adapted for use in directly heated apparatus. But it will readily be understood, that my invention is not limited to the use in such directly heated apparatus, and that it may also be embodied in apparatus in which simultaneously direct and indirect heating is provided, and also in apparatus which are indirectly heated. When performing the process in apparatus of the last named class, one of the advantages of my improved process is not availed of, that is advantage of having the reducing gas uniformly distributed. But otherwise the process has all the advantages referred to above.

I claim herein as my invention:

1. The herein described process of producing hydrogen, which consists in alternately passing a reducing gas and steam through a heated mass of iron the central zone of which has a greater permeability than the outer one.

2. The herein described process of producing hydrogen, which consists in alternately passing a reducing gas and steam through a heated mass of iron comprising a central zone containing large pieces of iron and an outer zone of smaller pieces of iron.

3. The herein described process of producing hydrogen, which consists in alternately passing a reducing gas and steam through a heated mass of iron comprising in its central part upright iron rods and a loose mass of iron surrounding the same.

4. The herein described process of producing hydrogen, which consists in alternately passing a reducing gas and steam through a heated mass of iron comprising in its central part upright tubular iron rods and a loose mass of iron surrounding the same.

5. The herein described process of producing hydrogen, which consists in passing heating gases at first through a layer of refractory material located in advance of a mass of iron, and thereafter through the mass of iron, and alternately passing said mass of iron a reducing gas and steam through the heated mass of iron, said mass of iron having at its central part a greater permeability than at its outer part.

6. The herein described process of producing hydrogen, which consists in alternately passing a reducing gas and steam through a heated mass of iron the central zone of which has a greater permeability than the outer one, passing the reducing gases coming from the mass of iron together with an air supply for supporting combustion through refractory heat storing means, and thereafter passing the steam through the said heat storing means prior to admitting the same to the mass of iron.

In testimony whereof, I have signed this specification in the presence of two subscribing witnesses.

KARL SCHAEFER.

Witnesses:
  ERNEST H. L. MUMMENHOFF,
  CHARLES A. HALLEY, Jr.